United States Patent
LaWhite et al.

(10) Patent No.: US 8,009,513 B2
(45) Date of Patent: Aug. 30, 2011

(54) TRANSDUCER ARRAY ARRANGEMENT AND OPERATION FOR SODAR APPLICATION

(75) Inventors: Niels LaWhite, Somerville, MA (US); Louis Manfredi, Amherst, MA (US); Walter L. Sass, Somerville, MA (US)

(73) Assignee: Second Wind Systems, Inc., Somerville, MA (US)

(*) Notice: Subject to any disclaimer, the term of this patent is extended or adjusted under 35 U.S.C. 154(b) by 788 days.

(21) Appl. No.: 11/934,915

(22) Filed: Nov. 5, 2007

(65) Prior Publication Data

US 2010/0195443 A1 Aug. 5, 2010

Related U.S. Application Data

(60) Provisional application No. 60/864,429, filed on Nov. 6, 2006, provisional application No. 60/941,302, filed on Jun. 1, 2007.

(51) Int. Cl.
*G01S 15/12* (2006.01)

(52) U.S. Cl. .................. 367/90; 73/170.13; 367/87

(58) Field of Classification Search .................. 367/153, 367/154, 90, 87; 73/170.13
See application file for complete search history.

(56) References Cited

U.S. PATENT DOCUMENTS

| | | | |
|---|---|---|---|
| 3,675,191 A | 7/1972 | McAllister | |
| 4,286,462 A | 9/1981 | Bourne | |
| 4,558,594 A | 12/1985 | Basler et al. | |
| 4,573,352 A | 3/1986 | Hurtig | |
| 4,641,290 A | 2/1987 | Massa et al. | |
| 4,831,874 A | 5/1989 | Daubin | |
| 4,833,360 A | 5/1989 | Holly | |
| 4,914,750 A | 4/1990 | Lawson | |
| 5,509,304 A | 4/1996 | Peterman et al. | |
| 5,521,883 A | 5/1996 | Fage et al. | |
| 5,544,525 A | 8/1996 | Peterman | |
| 5,808,967 A | 9/1998 | Yu | |
| 6,097,669 A | 8/2000 | Jordan | |
| 6,384,516 B1 | 5/2002 | Fraser | |
| 6,427,531 B1 | 8/2002 | Chintawongvanich | |
| 6,437,738 B1 | 8/2002 | Law | |
| 6,448,923 B1 | 9/2002 | Zrnic | |
| 6,503,204 B1 * | 1/2003 | Sumanaweera et al. | 600/459 |
| 6,535,158 B2 | 3/2003 | Wilkerson | |
| 6,608,237 B1 | 8/2003 | Li et al. | |
| 6,644,590 B2 | 11/2003 | Terpay | |
| 6,755,080 B2 | 6/2004 | Martin | |
| 6,805,219 B2 | 10/2004 | Yasuda et al. | |

(Continued)

OTHER PUBLICATIONS

International Preliminary Report on Patentability mailed Dec. 10, 2009, in corresponding PCT App. No. PCT/US2008/065266; International Filing Date: May 30, 2008; First Named Inventor: Niels LaWhite.

(Continued)

*Primary Examiner* — Ian Lobo
(74) *Attorney, Agent, or Firm* — Brian M. Dingman; Mirick, O'Connell, DeMallie & Lougee, LLP

(57) ABSTRACT

An array of transducers for a sodar system, and the operation of the array in a monostatic sodar system. The array is made up of a number of individual sound transducers. Each transducer emits sound into the atmosphere and senses emitted sound that has been reflected by the atmosphere. The transducers have a generally circular cross-sectional shape. The transducers are arranged in a generally planar, generally hexagonal grid packing arrangement.

21 Claims, 9 Drawing Sheets

U.S. PATENT DOCUMENTS

| | | | |
|---|---|---|---|
| 6,856,273 | B1 | 2/2005 | Bognar |
| 7,061,475 | B2 | 6/2006 | Kent |
| 2002/0130591 | A1* | 9/2002 | Fraser .......................... 310/334 |
| 2004/0031203 | A1 | 2/2004 | Russell et al. |
| 2004/0238275 | A1 | 12/2004 | Keller et al. |
| 2005/0036647 | A1 | 2/2005 | Nguyen |
| 2005/0074129 | A1 | 4/2005 | Fan |
| 2005/0165313 | A1 | 7/2005 | Byron et al. |
| 2006/0057351 | A1 | 3/2006 | Yang et al. |
| 2006/0179934 | A1 | 8/2006 | Smith et al. |
| 2006/0225952 | A1 | 10/2006 | Takayasu |
| 2007/0046108 | A1* | 3/2007 | Pearson et al. .................. 310/10 |
| 2008/0242991 | A1 | 10/2008 | Moon et al. |

OTHER PUBLICATIONS

International Preliminary Report on Patentability mailed Nov. 19, 2009, in corresponding PCT Application No. PCT/US2008/063196; International Filing Date May 9, 2008; First Named Inventor: Niels LaWhite.

Hummon, J.M. et al., "A Direct Comparison of Two RDI Shipboard ADCP's: a 75-kHz Ocean Surveyor and a 150-kHz Narrow Band," Journal of Atmospheric and Oceanic Technology, vol. 20, pp. 872-887 (2002).

International Search Report mailed Jan. 29, 2009, in PCT Application No. PCT/US2008/65266.

International Search Report mailed Jul. 15, 2008, in PCT Application No. PCT/US2008/063196; International Filing Date: May 9, 2008; First Named Inventor: Niels LaWhite.

International Search Report mailed Jul. 22, 2008, in PCT Application No. PCT/US2008/064463; International Filing Date: May 22, 2008; First Named Inventor: Niels LaWhite.

International Search Report mailed Dec. 16, 2008, in corresponding PCT Application No. PCT/US2008/065222; International Filing Date: May 30, 2008; First Named Inventor: Niels LaWhite.

Bradley, et al, Sodar Calibration for Wind Energy Applications, Mar. 2005, entire document, ISBN 0-954 1649-1-1.

Rinehart, Antenna Measurements: Dihedrals, ground targets and antenna beam patterns, AMS Radar Workshop, Jan. 14, 2001.

Argonne National Laboratory at http://www.atmos.anl.gov/ABLE/minisodar.html (last visited Nov. 1, 2007).

Atmospheric Research & Technology, LLC at http://www.sodar.com/about_sodar.htm (last visited Nov. 1, 2007).

Atmospheric Systems Corporation at http://www.minisodar.com/public/minisodar/cover.htm (last visited Nov. 1, 2007).

Bristol Industrial and Research Associates Limited a/k/a Biral at http://www.biral.com/met/sodar/2sodars.htm (last visited Nov. 1, 2007).

Bristol Industrial and Research Associates Limited a/k/a Biral at http://www.biral.com/images/met/sodar/2asodarssm.jpg (last visited Nov. 1, 2007).

Bristol Industrial and Research Associates Limited a/k/a Biral at http://www.biral.com/met/sodar/dimensions.htm (last visited Nov. 1, 2007).

Bristol Industrial and Research Associates Limited a/k/a Biral at http://www.biral.com/met/sodar/control.htm (last visited Nov. 1, 2007).

HV Sistemas S.L. at http://www.hvsistemas.es/en/sol/SODAR.html (last visited Nov. 1, 2007).

University of Northern British Columbia at http://cirrus.unbc.ca/images/sm_sodrad.jpg (last visited Nov. 1, 2007).

Wikipedia at http://www.en.wikipedia.org/wiki/Sodar (last visited Nov. 1, 2007).

Office Action dated Jun. 28, 2010 in related U.S. Appl. No. 12/117,994.

Office Action dated Jul. 27, 2010 in related U.S. Appl. No. 12/129,806.

* cited by examiner

… … …

TRANSDUCER ARRAY ARRANGEMENT AND OPERATION FOR SODAR APPLICATION

CROSS REFERENCE TO RELATED APPLICATIONS

This application claims priority of Provisional Patent Application Ser. No. 60/864,429, filed on Nov. 6, 2006, and Provisional Patent Application Ser. No. 60/941,302, filed on Jun. 1, 2007. The entire disclosures of both of these Provisional applications are incorporated herein by reference.

FIELD OF THE INVENTION

The present invention relates to a sonic detection and ranging (sodar) system.

BACKGROUND OF THE INVENTION

Sodar systems employ sound waves to detect atmospheric phenomena such as wind speed. A monostatic sodar operates by transmitting directional sound pulses and detecting reflected signals from a single apparatus. Phased-array monostatic sodars employ groups of acoustic transducers to emit and receive sound beams in different directions by electronic means. This is accomplished by varying the phase of transmitted signals from the individual transducers comprising the array and by varying the phase of the sampling process such that the transducers detect the signals reflected back from the atmosphere. The array itself remains physically motionless in operation. This approach is described in U.S. Pat. No. 4,558,594, the disclosure of which is incorporated herein by reference.

The phased array approach has the benefit that the directional power density of transmitted signals, and the directional sensitivity of the array to received signals, have a primary beam width which is extremely narrow compared to what is possible with a single transducer, and which can, with appropriate electronics, be oriented in a variety of directions.

Monostatic sodar systems typically use an array of transducers arranged in a rectangular grid packing arrangement such that the transducers are aligned in rows and columns, as shown in FIGS. 2, 4 and 5 of U.S. Pat. No. 4,558,594. These arrays are operated so that they emit three sequential beams, one normal to the plane of the array, and two tilted in altitude relative to the array and 90 degrees from one another in azimuth. The rectangular grid spacing, with circular transducers, leaves about 27% of the array as open space, which results in non-uniformity of sound pressure across the array, leading to potential measurement errors. Also, this inherently reduces the maximum intensity of the sound pressure, which reduces the array accuracy and sensitivity. Further, the use of asymmetric sound beams results in asymmetric sensing, which causes measurement and calculation errors.

SUMMARY OF THE INVENTION

The invention includes an arrangement or array of acoustic transducers for a sodar system, and a system and method of operating the array to accomplish improved atmospheric detection. In one aspect, the invention comprises grouping an array of acoustic transducers in a generally hexagonal grid packing arrangement instead of a conventional rectangular grid packing arrangement. The inventive array is preferably used in a monostatic sodar system. In another aspect, the invention comprises operating the transducers as a phased array operated sequentially in three orientations of rows that are 120° apart, instead of two orientations of rows that are 90° apart. This operation accomplishes three sequential sound beams with their principal axes spaced apart from one another 120° in azimuth. Preferably, the beams are each at the same elevation. The result is that the principal axes of the three beams are evenly spaced around the surface of a virtual vertically oriented cone with its apex at the center of the array.

Preferably, transducers with symmetric (circular) actuators and horns are employed in the invention, so that there is no inherent directionality with each transducer. One advantage of the invention is that the generally hexagonal grid packing arrangement of the array creates an array in which the area encompassed by each transducer approximates the circular shape of the transducer actuators, the transducer horns, and the acoustical dispersion patterns associated with them. This transducer packing arrangement inherently reduces the undesirable acoustic characteristics of the spaces between the horns, which improves the uniformity of sound pressures across the front of the array. Improved uniformity reduces emanations of sound beyond the perimeter of the directed beams, and symmetrically also reduces the sensitivity of the array in receive mode to off-beam sounds.

Another advantage is that the generally hexagonal transducer grid packing arrangement allows more transducers to be employed in a given area than is allowed by rectangular grid spacing of the transducers, in which the transducers are aligned in rows and columns. The transducer packing density of the inventive array also improves the uniformity and intensity of sound pressure across the front of the array.

Another advantage is that the operation of the array that is physically symmetric along each of the azimuthal directions along which beams are propagated, with three beams orientated 120° apart, makes sodar operations based on three sequential sound beams physically symmetric. This allows the sodar enclosure to be shaped symmetrically, which in turn produces sound beams, both transmitted and received, that are shaped symmetrically. Thus, distortions created by interactions with the enclosure are inherently applied to all three orientations. This reduces measurement and calculation errors from asymmetric operation.

Yet another advantage is that the operation of the array, with three beams orientated 120° apart, allows for a maximum angle between the centers of the various beams, for any particular maximum angle between the center of any one beam and the zenith. Since increasing the angle between the various beams increases accuracy, while increasing the angle between each beam and the zenith detracts from accuracy and reliability of data capture due to atmospheric effects, this configuration has improved accuracy and data capture relative to the prior art.

This invention features an array of transducers for a sodar system, comprising a plurality of individual sound transducers, for emitting sound into the atmosphere and for sensing emitted sound that has been reflected by the atmosphere, in which the transducers are arranged in a generally planar, generally hexagonal grid packing arrangement. The array may comprise a series of rows of tightly-packed essentially identical transducers, with the transducers in adjacent rows offset from one another, in a direction orthogonal to the row longitudinal axes, by about half the width of a transducer. The transducers themselves may define a generally hexagonal perimeter shape. The transducer horns may have a generally circular cross sectional shape.

The array preferably comprises at least thirty-six transducers. The transducers may be arranged in at least seven rows. Each of the six sides of the grid pattern may be defined by at least three transducers, and is preferably defined by four transducers. In one embodiment, the first row (the row making up a side of the array) comprises four transducers, the row behind each side comprises five transducers, the three rows behind that each comprise six transducers, the row behind those three rows comprises five transducers, and the back row comprises four transducers.

The array is preferably operated so as to produce three sequential beams spaced about 120° apart in azimuth. The transducers making up a row are preferably operated in unison at essentially the same frequency, and the operation of each sequential row is uniformly phase-shifted relative to the immediately proceeding row, to create beams that are tilted in altitude relative to the plane of the transducers. The row-to-row phase shift may be about sixty degrees. The beam angular width may be about five degrees from the beam main axis to the beam half power point. Each of the three beams may be transmitted along a main beam axis, and the three beam main axes may be at essentially the same altitude. The beam main axes may be at an altitude of about 10 degrees from the normal to the plane of the transducers. In a specific embodiment, the beam altitude is 11.2 degrees from the normal. The array is preferably operated so as to produce a plurality of essentially identical beams, with the angular width of each of the beams preferably being about five degrees from the beam main axis to the beam half power point.

The transducers may have a generally hexagonal perimeter. The active area of the transducers may comprise at least about ninety percent of the array area. The transducers may be horn tweeters. The transducers preferably define a circular cross section. The transducers are preferably about three inches in diameter. The transducers may have a plastic cone. The transducer cones may be polycarbonate.

Also featured is an array of transducers for a sodar system, comprising a plurality of individual sound transducers, for emitting sound into the atmosphere and for sensing emitted sound that has been reflected by the atmosphere, in which the active area of the transducers comprises about ninety percent of the array area.

Further featured is an array of transducers for a sodar system, comprising a plurality of individual sound transducers, for emitting sound into the atmosphere and for sensing emitted sound that has been reflected by the atmosphere, in which the transducers are arranged in a generally planar, generally hexagonal grid packing arrangement comprising a series of rows of tightly-packed essentially identical transducers, with the transducers in adjacent rows offset from one another, in a direction orthogonal to the row longitudinal axes, by about half the width of a transducer, and with at least three transducers defining each of the six sides of the grid pattern, and in which the array is operated so as to produce three sequential, essentially identical and symmetric beams spaced about 120° apart in azimuth, the operation comprising operating the transducers making up a row in unison at essentially the same frequency, with the operation of each sequential row being uniformly phase-shifted relative to the immediately proceeding row, to create beams that are tilted in altitude relative to the plane of the transducers.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein.

DETAILED DESCRIPTION OF EMBODIMENTS OF THE INVENTION

Figure 1:
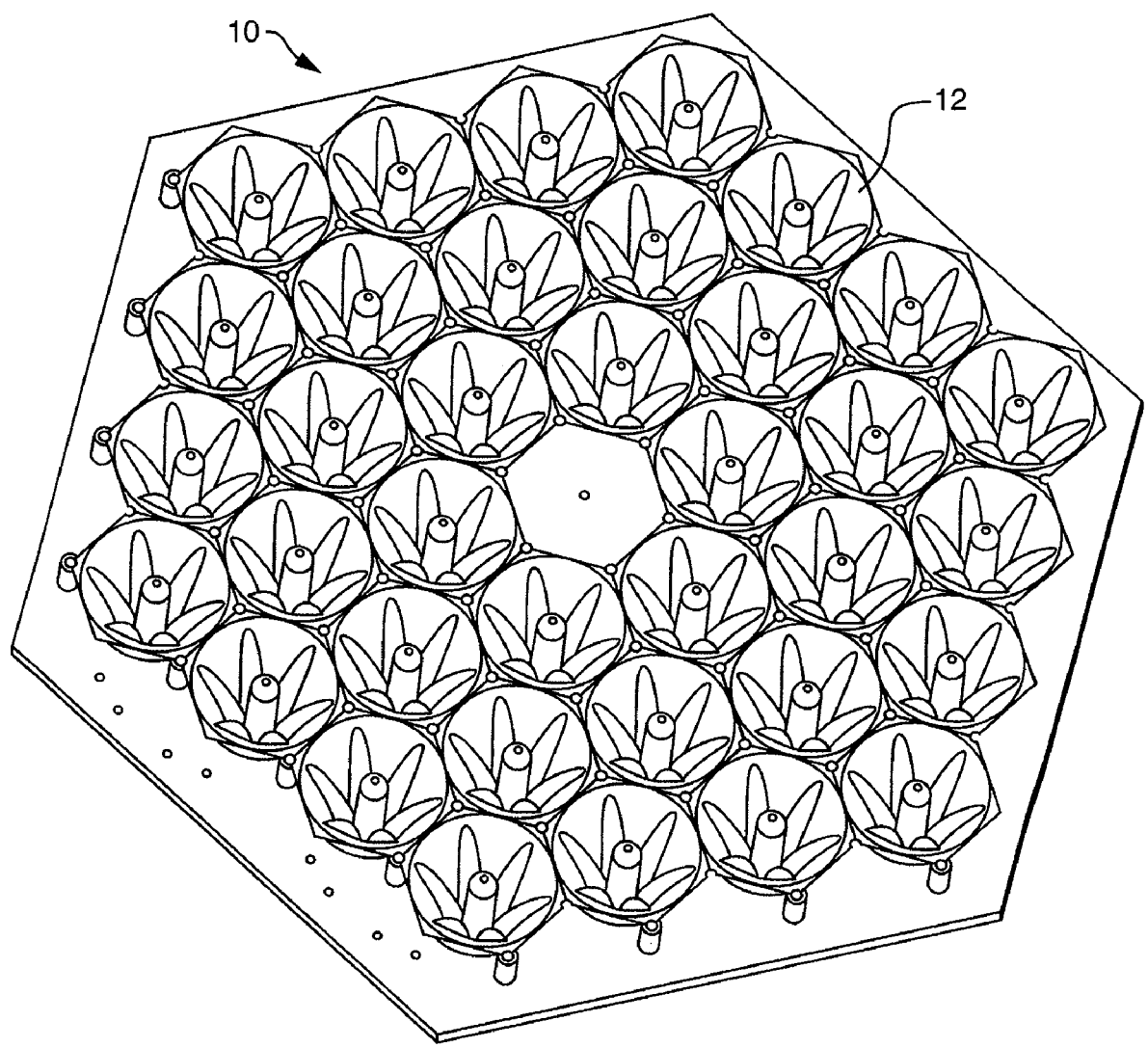
FIG. 1 is a perspective view of a thirty six-transducer element array for an embodiment of the invention.

Monostatic sodars employ sequential, directed beams of sound as part of their operation. Individual acoustic transducers typically emanate sound in a wide wavefront approximating the surface of a sphere, rendering them unsuitable for sodar use without a focusing mechanism. Array 10 of closely packed and evenly-spaced transducers, FIG. 1, can accomplish focusing by producing a complex interfering pattern of wavefronts that effectively creates a principal beam that is narrower than that of an individual transducer. The angular spread of the beam is related to the number of transducers in the array: more transducers generally can create a narrower beam. Arrays of thirty-two to sixty transducers are usually adequate to produce beams that are narrow enough for sodar applications; array 10 has thirty-six transducers 12. Each transducer 12 has a circular actuator and horn. Transducers 12 are closely packed along a number of parallel rows (seven such rows in the non-limiting preferred embodiment of the invention shown in FIG. 1), with the transducers in adjacent rows offset from one another in a direction orthogonal to the rows by one half of a transducer diameter. This arrangement is termed herein a generally hexagonal grid packing arrangement.

Each transducer is preferably of hexagonal overall perimeter shape, closely circumscribing a circular active horn region of 3 inches in diameter. The transducer is based on a standard piezo-electric horn "tweeter" element modified in external shape to facilitate the hexagonal grid packing arrangement. The paper cone of the transducer can be replaced with a plastic (preferably polycarbonate) cone to improve the weather-resistance of the apparatus. Transducers 12 are provided with connectors for convenient installation and replacement in the apparatus. The transducer is designed to operate efficiently as both a transmitter and receiver of sound at the approximately 4000 (more specifically 4425) Hz operating frequency preferred for the apparatus. The size of the transducers is such that the phased array technique can create beams of sound with good directionality using a reasonable number of transducers. Other shapes and types of transducer elements are not as efficiently assembled into hexagonal arrays, do not operate efficiently as both transmitter and receiver at the desired operating frequency, and are not as suitable for installation in an apparatus operating in an exposed environment.

The generally hexagonal external shape of the array, and the generally hexagonal grid packing arrangement of the array, also permits the directional control necessary to steer beams without mechanical devices. Beam steering is accomplished by driving the transducers in a sequence of parallel rows, with the transducers within each row driven in phase with each other, and each of the rows driven at the same wavelength but with successive, equal phase shifts row-to-row. If there is no phase shift between rows, the principal beam is emitted along an axis that is orthogonal to the plane of the array. As phase shift is introduced, the interference pattern changes such that the beam is directed at altitudes that are no longer vertical (assuming the array is horizontal). Also, the beam is orthogonal to the axes along which the transducers making up each of the rows lie. Thus, by driving the transducers in rows of differing relative orientation, beams can be created that are directed along desired azimuthal directions.

Array 10 is comprised of a series of rows of closely-packed transducers. Each transducer has a generally hexagonal perimeter shape. This perimeter closely circumscribes the active transducer region, which is circular. The hexagonal perimeter primarily exists to facilitate assembling the array. There may be some additional advantage if the active transducer region itself were hexagonal, effectively eliminating all dead (i.e., non sound producing) area in the array. Similarly, a square transducer with a square active horn area, along with the transducers in adjacent rows offset by about one-half of the transducer width in accordance with the invention, could provide some (but not all) of the benefits of this invention as compared to the prior-art rectangularly arranged arrays. The array is thus itself generally hexagonal.

The generally hexagonal grid packing arrangement makes each active element of the array occupy a hexagonal area that is only about 10% greater than the actual area occupied by the circular shape of each transducer horn. Thus, only about 10% of the array area is not involved in sound production or sensing. This is contrasted with a prior art rectangular grid array element arrangement, in which each circular transducer occupies a square area that is about 27% greater than the actual area occupied by the circular transducer horn. The hexagonal grid array packing arrangement of the invention minimizes the area of the entire array that does not contribute to the desired interference pattern, nor to the uniformity of the sound pressure across the array. The air motion in the regions between the circular transducers can also create interference patterns that create sound emanations in other directions than the intended beams. The undesired emanations reduce the ability of the sodar system to resolve the directions of the beams, thus reducing its measurement performance. The undesired emanations can also radiate horizontally enough to strike trees and other adjacent objects, creating echoes of similar or greater magnitude than the reflections off the atmospheric phenomena from the intended beams.

Figure 2A:
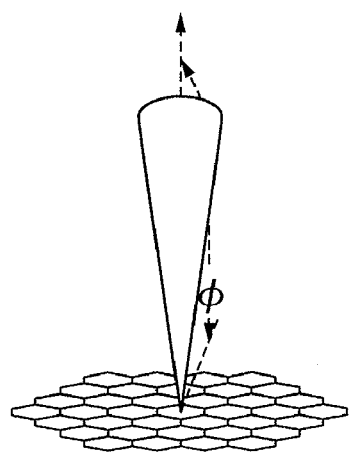
FIGS. 2A, 2B and 2C schematically depict three beams created by operation of the array of FIG. 1 in accordance with an embodiment of the invention. In these figures the beam is depicted at a much smaller scale than the array itself, for the sake of clarity.
Figure 2B:
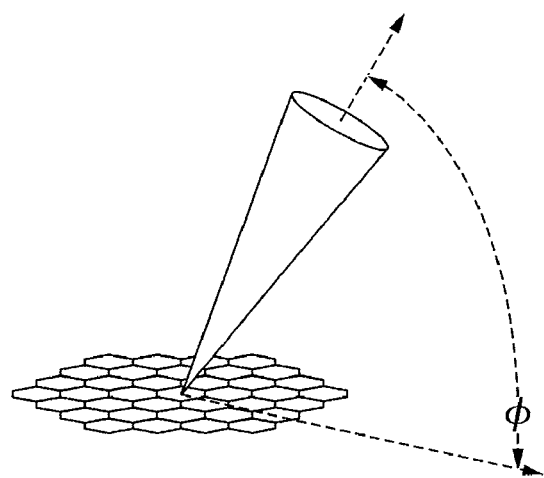
Figure 2C:
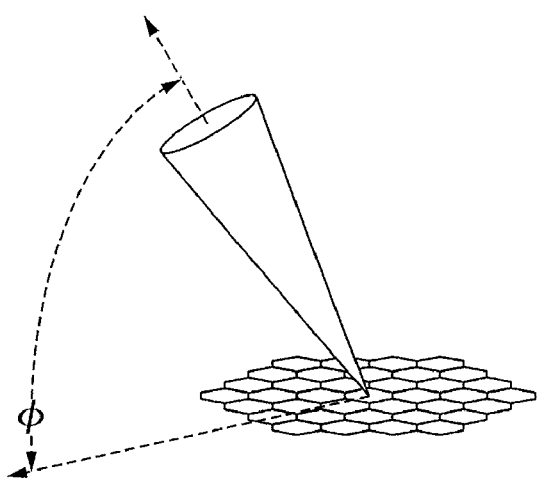
Figure 3A:
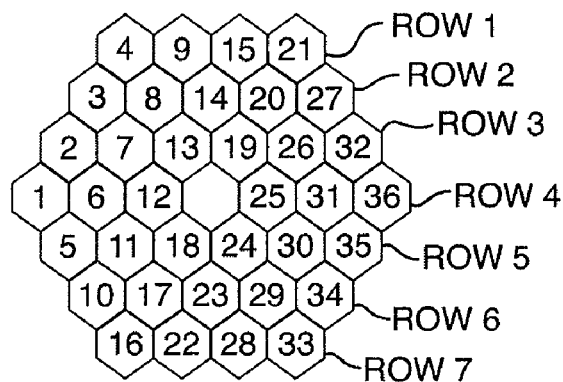
FIGS. 3A, 3B and 3C show the array element rows that are sequentially operated in order to produce the beams of FIGS. 2A, 2B and 2C, respectively.
Figure 3B:
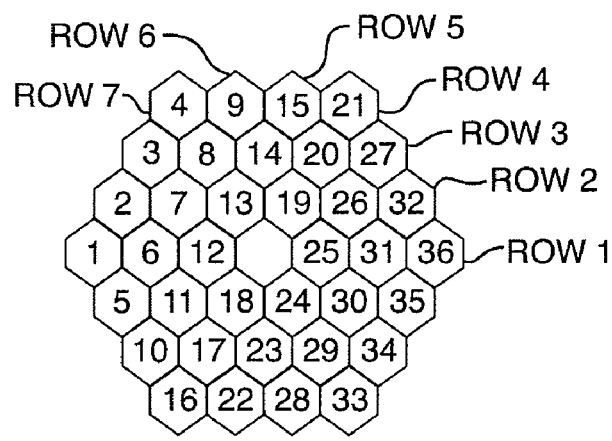
Figure 3C:
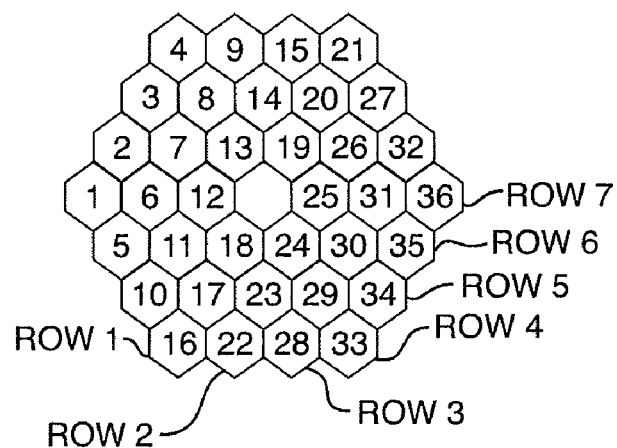

The hexagonal array of the invention is physically symmetric about six radial axes spaced sixty degrees apart. This can be accomplished with three or more transducers in each of the six outer rows making up the six sides of the hexagon, along with the transducers being closely packed in the array (in which adjacent parallel rows of the array have their transducers offset by half a transducer width). The inventive generally hexagonal grid packing arrangement allows operation to sequentially produce from three to six generally conical beams that emanate along principal beam axes that are generally symmetrical around and lie on the surface of a virtual vertical cone having its apex located at the center of the array. The preferred embodiment creates three such beams spaced 120° apart. The beams are at a favorable altitude that is determined by the manner of operation. Such beams are schematically depicted in FIGS. 2A-2C. This depiction is highly schematic, as the bottom of the beam is more like a circle roughly the size of the array. The effective length of the beam is about 400 times the diameter of the array. The operation of the array to produce such beams is schematically illustrated in FIGS. 3A-3C. A schematic block diagram of a system for accomplishing this operation is shown in FIG. 6.

For example, in order to produce beam 1 that is schematically shown in FIG. 2A, transducers 4, 9, 15 and 21 making up row 1 are driven with a particular waveform; transducers 3, 8, 14, 20 and 27 making up row 2 are driven by the same waveform with a phase shift of n; row 3 with a phase shift of 2n from row 1; row 4 shifted by 3n from row 1; row 5 by 4n; row 6 by 5n; and row 7 by 6n. Beam 2 is produced as shown in FIG. 3B by shifting the first row 120° in a clockwise fashion, such that the first row includes transducers 33, 34, 35 and 36, with rows 2-7 indicated in the drawing, and operating the array in the same fashion. Beam 3 is likewise produced as shown in FIG. 3C by again shifting the first row 120° in a clockwise fashion, such that the first row includes transducers 1, 5, 10 and 16, with rows 2-7 also indicated in the drawing and again operating the rows in the same fashion.

Figure 6:
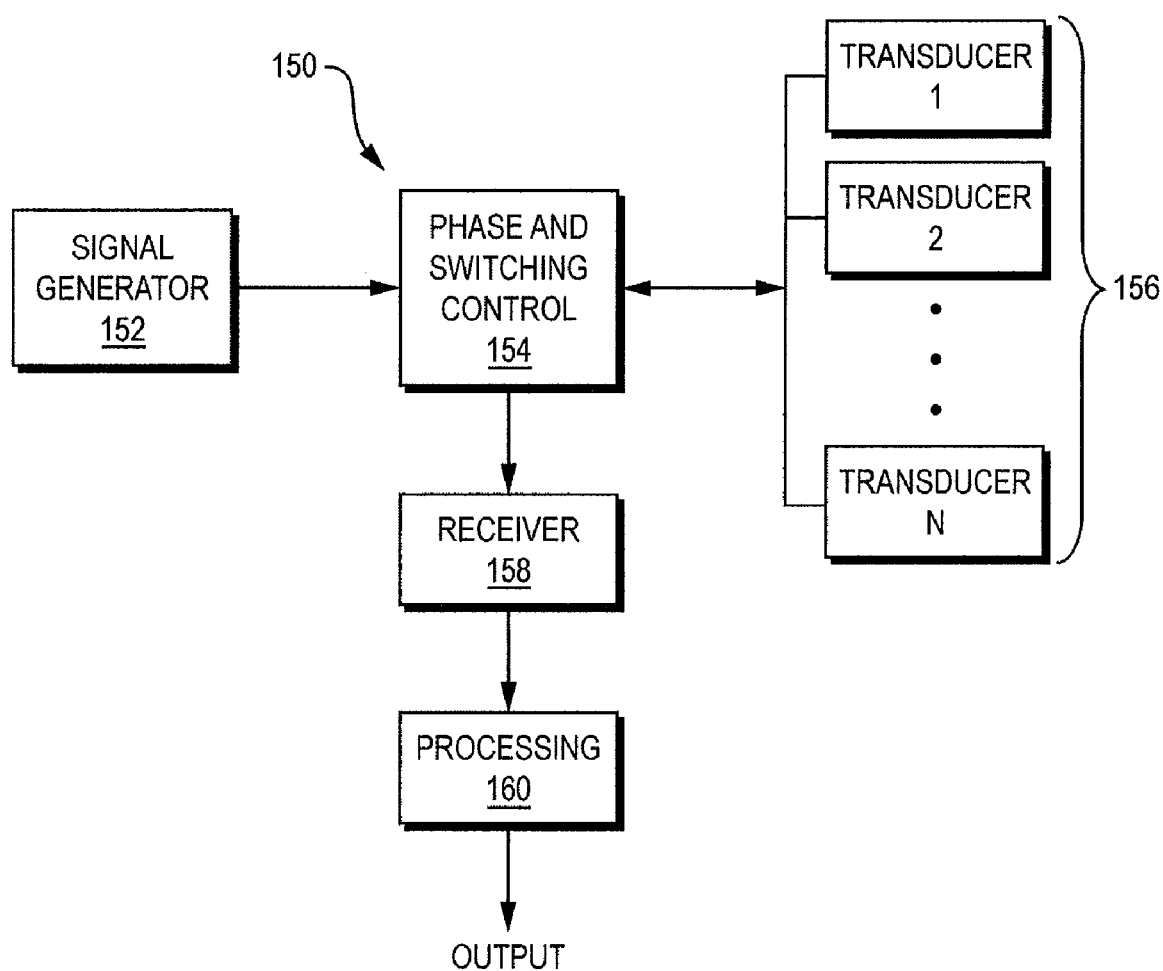
FIG. 6 is a schematic block diagram of a system for operating a transducer array in accordance with the invention.

System 150, FIG. 6, accomplishes this operation with signal generator 152 that supplies signals to phase control and switching control 154, which supplies the appropriate transducer drive signals to array 156 of transducers 1-N. The echo signals received by transducer array 156 are routed to receiver 158 and processor 160, which outputs atmospheric information that can be derived from a sodar system. The derivation of atmospheric information from sodar signals is known in the art, for example as set forth in U.S. Pat. No. 4,558,594.

System 150 can be accomplished as all hardware, or a combination of hardware and firmware, as would be apparent to one skilled in the art. Preferably, system 150 is accomplished with hardware, except that all of signal generator 152, and portions of phase and switching control 150, are implemented as firmware within microprocessors and a DSP chip.

Figure 4A:
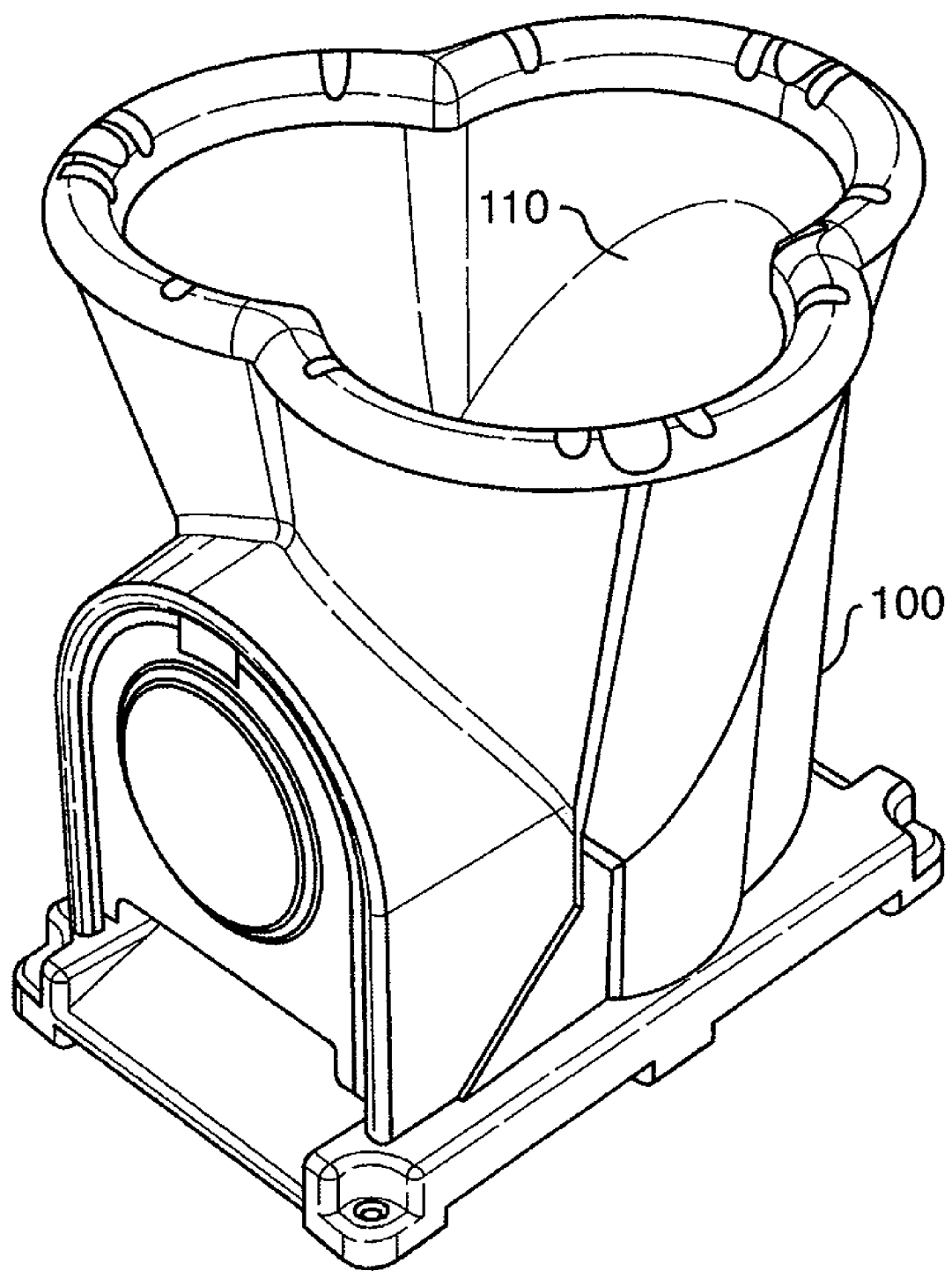
FIGS. 4A and 4B are different perspective views.
Figure 4B:
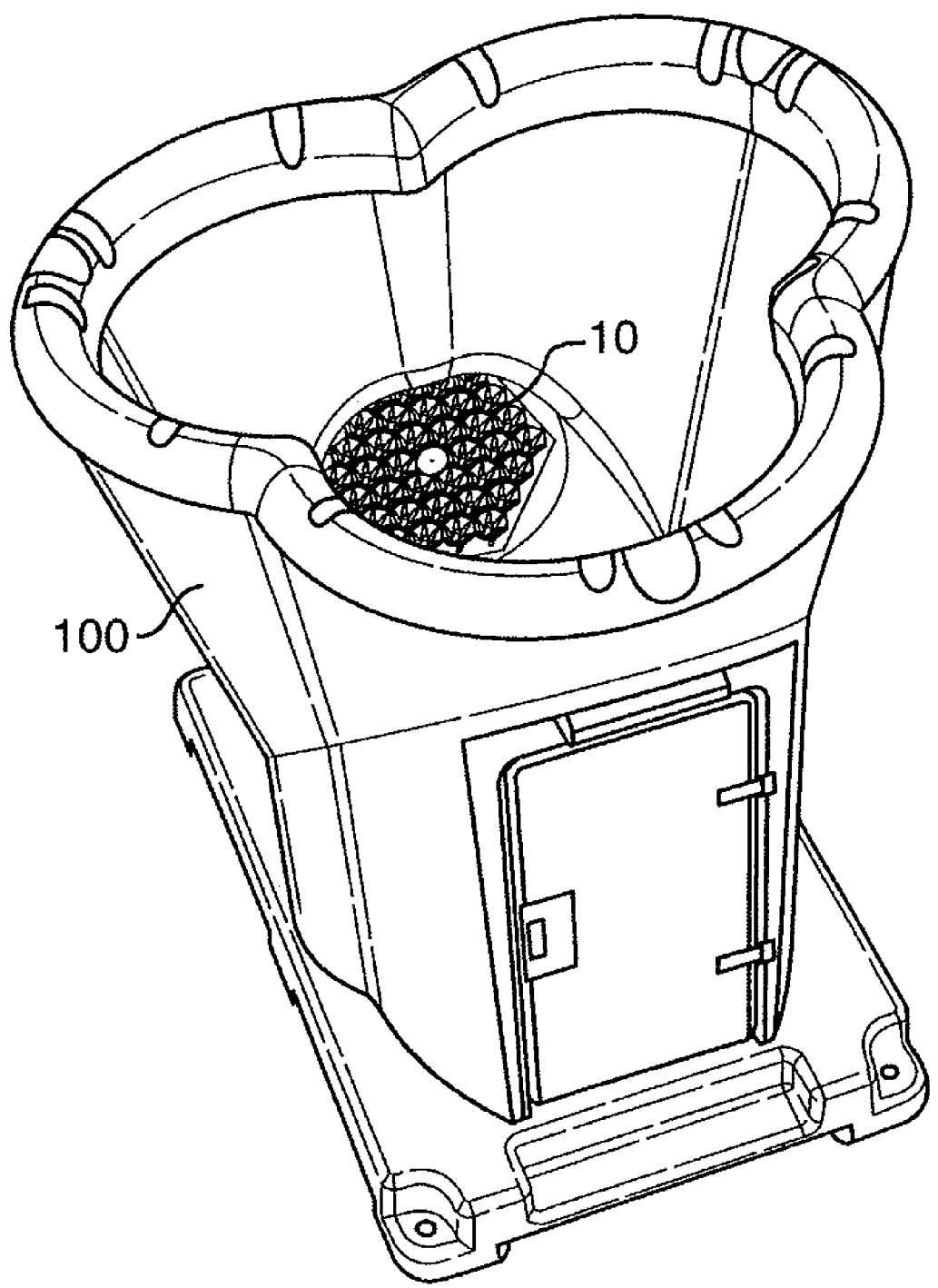
Figure 4C:
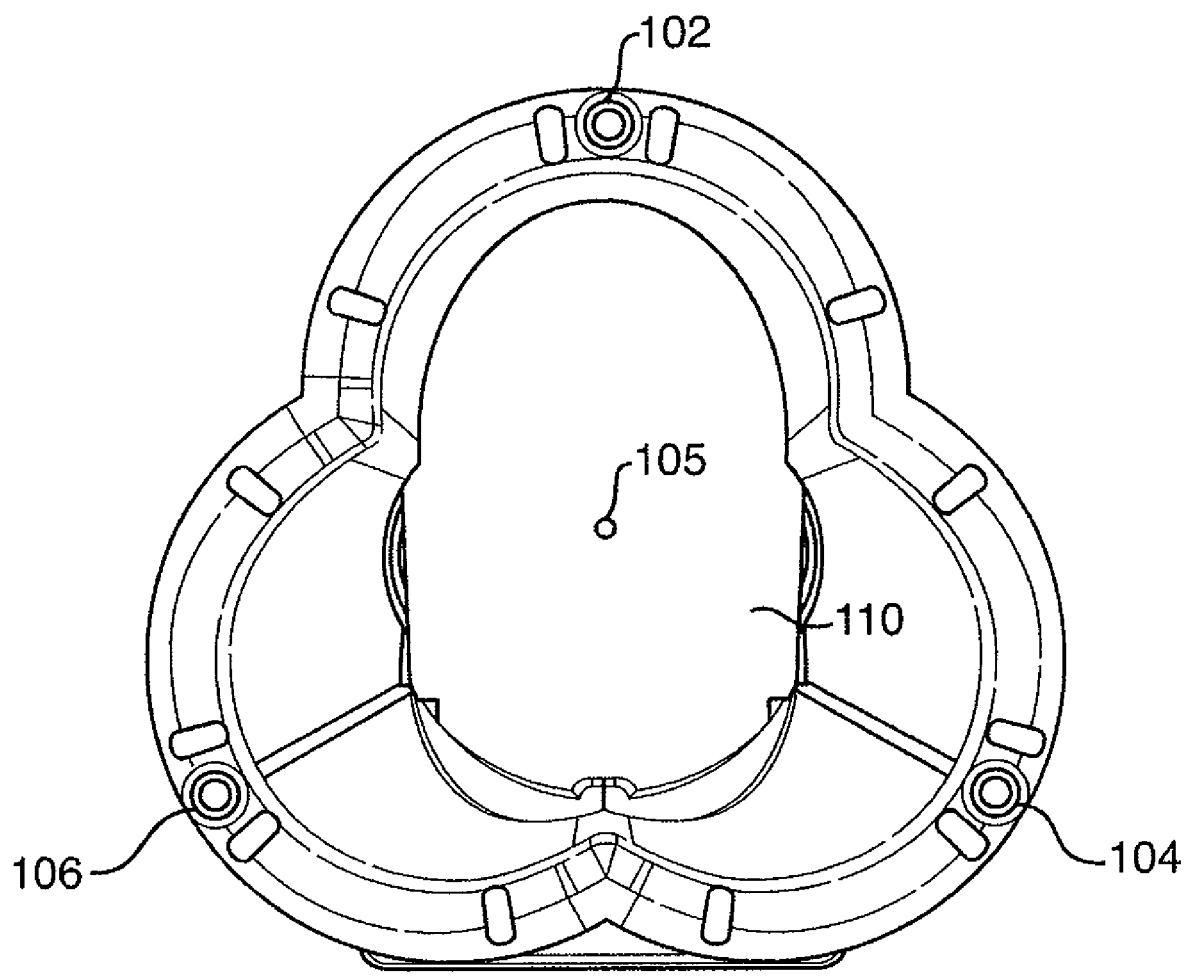
FIG. 4C is a top view, of the preferred embodiment of the sodar enclosure for the transducer array of FIG. 1.

As the transducer arrangement of array 10 is symmetric with respect to each of the six sides of the hexagonal array, the three beams are essentially identical to one another, the only difference being the azimuthal direction of the beams' main axes. Up to six such beams could be created. Horn-shaped enclosure 100, FIGS. 4A-4C, is similarly symmetrically shaped, defining three identically-shaped lobes 102, 104 and 106 spaced 120° apart about central vertical axis 105 of enclosure 100.

Figure 4D:
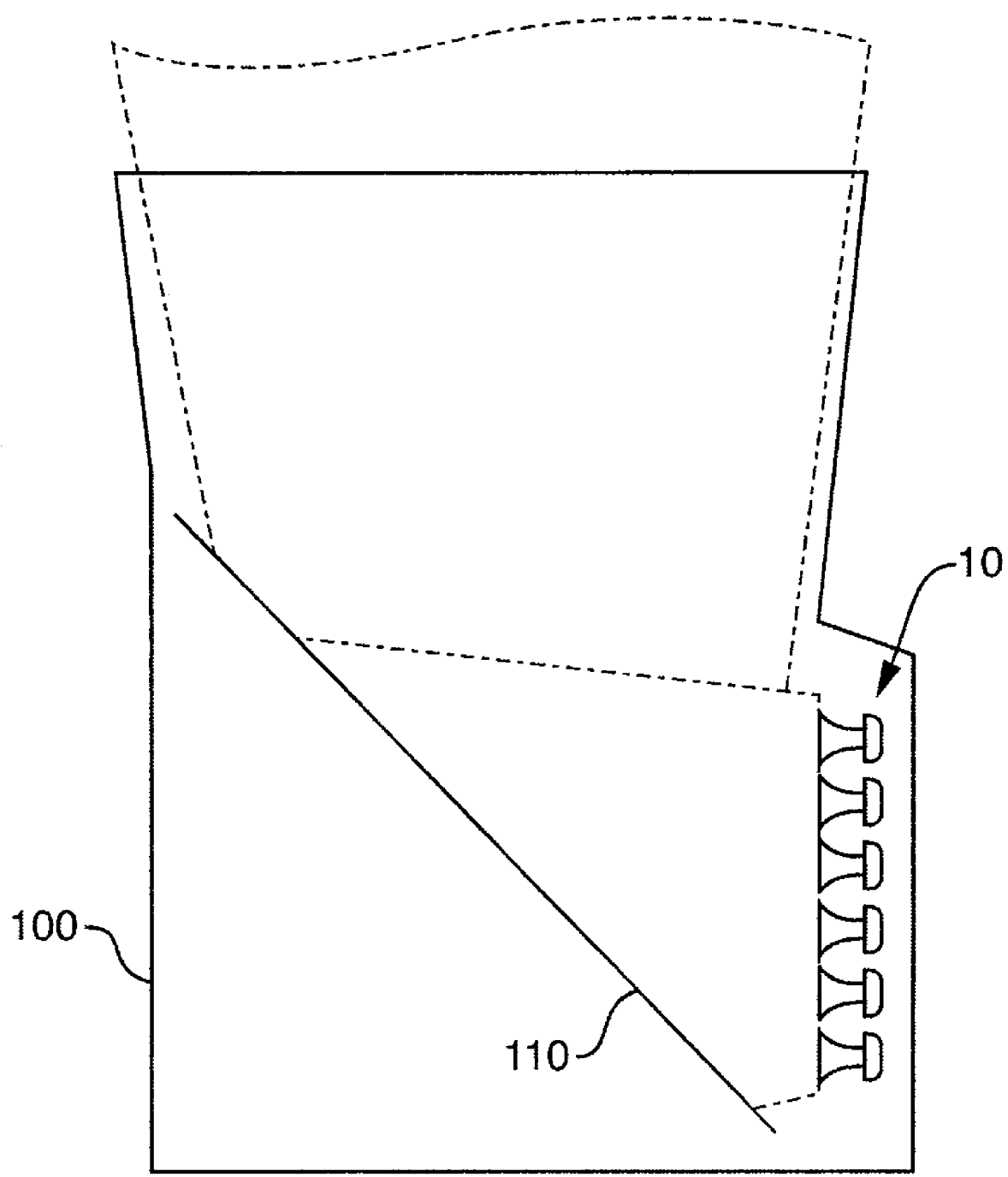
FIG. 4D is a simplified, schematic cross-sectional view of the enclosure shown in FIGS. 4A-4C, detailing the sound beam path.
Figure 5:
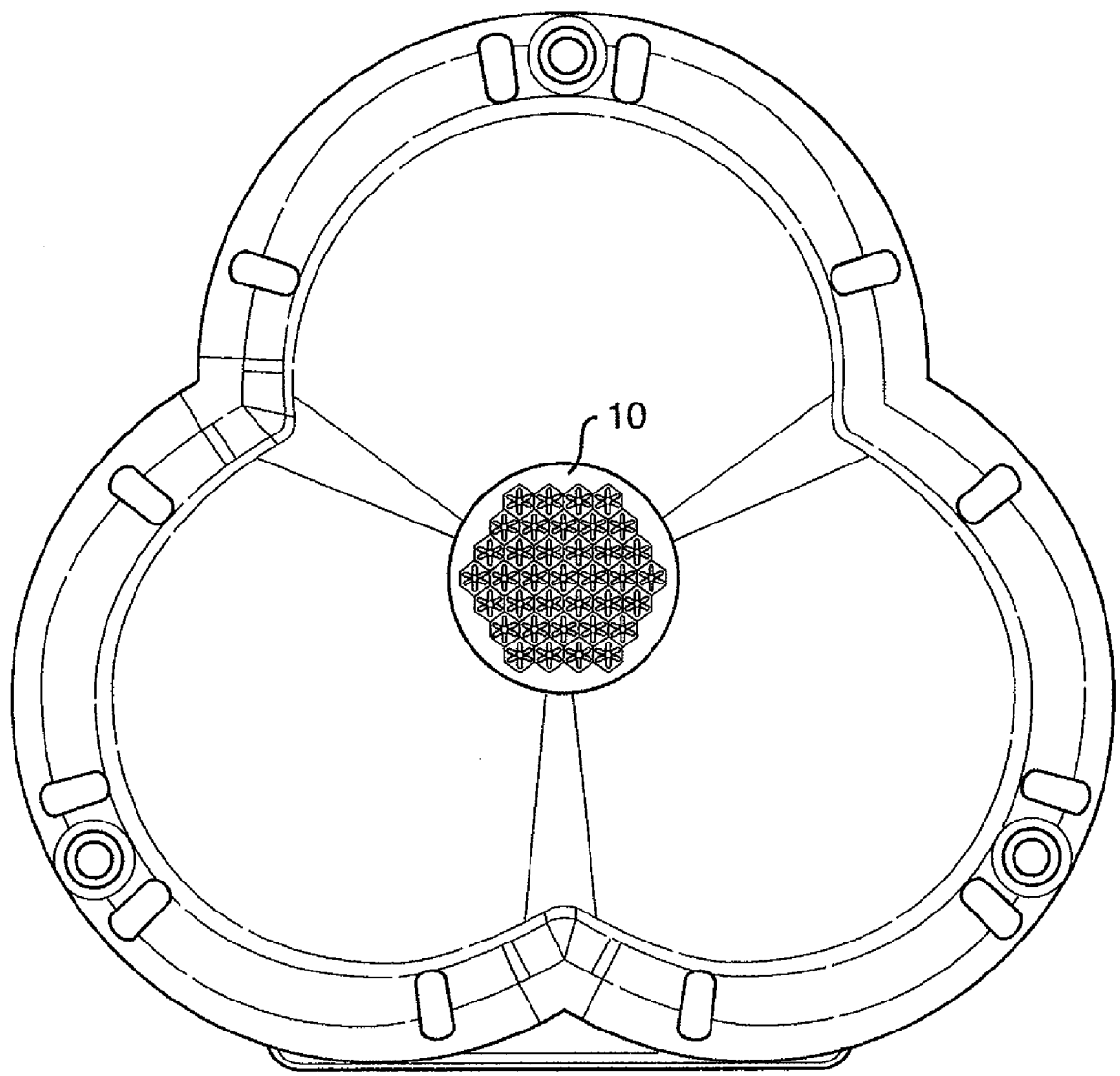
FIG. 5 is a top view of an alternative arrangement of the transducer array in an enclosure of the same general design as that shown in FIGS. 4A-4D.

In enclosure 100, array 10 is positioned vertically, facing a flat surface 110 that is 45° from vertical so that it acts as a sound mirror. See the schematic cross-sectional view of FIG. 4D. This arrangement acoustically approximates the same array 10 being positioned horizontally at the center bottom of the enclosure, as shown in the top view of an alternative embodiment, FIG. 5. The vertical array position shown in FIG. 4D inhibits the transducers from collecting water, ice, snow, or debris.

In one non-limiting embodiment, each transducer is about three inches in diameter, and the array is operated at frequencies corresponding to wavelengths of approximately 3 inches. A typical frequency may be 4425 Hz. Sounds of this wavelength have been found to both reflect from and travel through turbulence and thermal gradations in the atmosphere, a compromise that is essential to sodar operation. With the preferred array made up of thirty six transducers in seven rows, the phase shift from row to row is about 60 degrees, (or, about $3.75 \times 10^{-5}$ sec) which accomplishes a beam tilted at about ten degrees (more specifically at 11.2 degrees) in altitude from the normal to the plane of the transducers, and with a main beam angular width of about five degrees measured from the main beam axis to the half power point. The beam power drops to about zero at a null that is located at about ten degrees from the beam main axis (a total beam width of about twenty degrees). Preferably, each of the three lobes of housing 100 defines an inner surface that lies at about the location of this null. This allows the full main beam to be utilized in atmospheric sensing while helping to intercept and thus squelch both unwanted emanations that are not part of the main beam, and unwanted return signals.

The preferred embodiment of the array as shown in FIG. 1 has thirty-six transducers; there is no transducer at the center of the array, although there could be. This is primarily due to the electronics in the preferred embodiment, which were designed around integrated circuits that are generally used for surround sound applications. These circuits each have 3 left and 3 right channels—for a total of six each. So each sixty-degree segment of the array can be neatly handled by one of these circuits, for a total of six geometrically and electronically identical subdivisions of the transmitting circuit. Adding the 37th transducer to the center of the array thus adds substantial complexity to the transmitting circuit design, as well as to the firmware. Testing indicated that the center speaker doesn't have a substantial impact on the directionality of the unit—at best it might increase directionality by 3%, while it increases cost and complexity by perhaps as much as 17%. Accordingly, leaving the center speaker out is an appropriate trade-off between cost and functionality.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, operating frequency and wavelength, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A monostatic sodar system, comprising:
    an array of essentially identical individual acoustic horn transducers, each transducer comprising a circular or hexagonal active region from which sound is emitted during a sound emission and into which sound is received during a reception of emitted sound that has been reflected by the atmosphere, with each transducer occupying a generally hexagonal area of the array, in which the transducers are arranged in a generally planar grid packing arrangement comprising a series of rows of tightly-packed transducers, the transducers in adjacent rows offset from one another in a direction orthogonal to the row longitudinal axes by about half the width of a transducer;
    a signal generator that generates signals that are used to drive the transducers;
    a phase and switching control that receives the signals from the signal generator and provides transducer drive signals to the transducers that cause the array to produce at least three sequential, essentially identical and symmetric generally conical beams spaced apart in azimuth, wherein for each such beam the phase and switching control operates the transducers making up a row in unison at essentially the same frequency, with the operation of sequential rows uniformly phase-shifted relative to the immediately preceding row, to tilt the beam in altitude relative to the vertical;
    a receiver that receives signals from the transducers during a reception of emitted sound that has been reflected by the atmosphere; and
    an open-top enclosure in which the array, signal generator, phase and switching control and receiver are located, the enclosure comprising upwardly and outwardly-directed curved walls that define three flared lobes spaced 120 degrees apart, wherein one of the beams leaves the enclosure from each of the lobes.

2. The monostatic sodar system of claim 1 in which each beam defines a main axis, and an about zero power null located at an angle from the beam main axis, and wherein the enclosure walls that define the lobes are located at about the locations of the nulls of the beams.

3. The monostatic sodar system of claim 2 in which the array is oriented generally vertically, and the system further comprises a sound reflector within the enclosure and located and arranged such that it reflects the beams from a generally horizontal orientation as they leave the array, to a generally vertical orientation as they leave the enclosure.

4. The array of claim 1 in which the transducers each define a generally hexagonal perimeter shape, and the transducers are arranged in a generally hexagonal grid packing arrangement defining six sides, with at least three transducers defining each of the six sides of the grid packing arrangement.

5. The array of claim 4 wherein the phase and switching control provides transducer drive signals that cause the array to produce three sequential beams spaced about 120° apart in azimuth.

6. The array of claim 5 in which the row-to-row phase shift is about sixty degrees.

7. The array of claim 5 in which the beam angular width is about five degrees from the beam main axis to the beam half power point.

8. The array of claim 5 in which each of the three beams is transmitted along a main beam axis, and the three beam main axes are at essentially the same altitude.

9. The array of claim 8 in which the beams' main axes are at an altitude of about 10 degrees from the vertical.

10. The array of claim 9 in which the beams' main axes are at an altitude of 11.2 degrees from the vertical.

11. The array of claim 1 comprising at least thirty-six transducers.

12. The array of claim 11 in which the transducers are arranged in at least seven rows.

13. The array of claim 12 in which the array defines six sides, and each of the six sides of the array comprises at least four transducers.

14. The array of claim 13 in which the row behind each side comprises at least five transducers, the three rows behind that each comprise at least six transducers, the row behind those three rows comprises at least five transducers, and the back row comprises at least four transducers.

15. The array of claim 1 in which the active area of the transducers comprises at least about ninety percent of the array area.

16. The array of claim 1 in which the transducers are horn tweeters.

17. The array of claim 16 in which the transducers are about three inches in diameter.

18. The array of claim 1 in which the transducers have a plastic cone.

19. The array of claim 18 in which the transducer cones are polycarbonate.

20. A monostatic sodar system, comprising:
an array of essentially identical acoustic transducers, each transducer comprising a cone transducer element which generates and receives sound and a horn which guides the sound to and from the cone to a circular or hexagonal active region from which sound is emitted during a sound emission and into which sound is received during a reception of emitted sound that has been reflected by the atmosphere, each transducer defining a generally hexagonal perimeter shape and occupying a generally hexagonal area of the array, in which the transducers are arranged in a generally vertical plane and in a generally hexagonal grid packing arrangement defining six sides and comprising a series of rows of tightly-packed transducers, the transducers in adjacent rows offset from one another in a direction orthogonal to the row longitudinal axes by about half the width of a transducer, and with at least four transducers defining each of the six sides of the grid packing arrangement;
a signal generator that generates signals that are used to drive the transducers;
a phase and switching control that receives the signals from the signal generator and provides transducer drive signals to the transducers that cause the array to produce three sequential, essentially identical and symmetric generally conical beams spaced about 120° apart in azimuth, wherein for each such beam the phase and switching control operates the transducers making up a row in unison at essentially the same frequency, with the operation of sequential rows uniformly phase-shifted relative to the immediately preceding row, to tilt the beams at essentially the same altitude relative to the vertical;
a receiver that receives signals from the transducers during a reception of emitted sound that has been reflected by the atmosphere;
an open-top enclosure in which the array, signal generator, phase and switching control and receiver are located, the enclosure comprising upwardly and outwardly-directed curved walls that define three flared lobes spaced 120° apart, wherein one of the beams leaves the enclosure from each of the lobes, in which each beam defines a main axis, and an about zero power null located at an angle from the beam main axis, and wherein the enclosure walls that define the lobes are located at about the locations of the nulls of the beams; and
a sound reflector within the enclosure and located and arranged such that it reflects the beams from a generally horizontal orientation as they leave the array, to a generally vertical orientation as they leave the enclosure.

21. A monostatic sodar system, comprising:
an array of at least thirty-six essentially identical acoustic transducers, each transducer comprising a polycarbonate cone transducer element which generates and receives sound and a horn which guides the sound to and from the cone to a circular or hexagonal active region from which sound is emitted during a sound emission and into which sound is received during a reception of emitted sound that has been reflected by the atmosphere, each transducer defining a generally hexagonal perimeter shape and occupying a generally hexagonal area of the array, in which the transducers are arranged in a generally vertical plane and in a generally hexagonal grid packing arrangement defining six sides and comprising at least seven rows of tightly-packed transducers, the transducers in adjacent rows offset from one another in a direction orthogonal to the row longitudinal axes by about half the width of a transducer, and with at least four transducers defining each of the six sides of the grid packing arrangement and in which the row behind each side comprises at least five transducers, the three rows behind that each comprise at least six transducers, the row behind those three rows comprises at least five transducers, and the back row comprises at least four transducers;
a signal generator that generates signals that are used to drive the transducers;
a phase and switching control that receives the signals from the signal generator and provides transducer drive signals to the transducers that cause the array to produce three sequential, essentially identical and symmetric generally conical beams spaced about 120° apart in azimuth, wherein for each such beam the phase and switching control operates the transducers making up a row in unison at essentially the same frequency, with the operation of sequential rows uniformly phase-shifted at about sixty degrees relative to the immediately preceding row, to tilt the beam at about 10 degrees from the vertical, the beams having an angular width of about five degrees from the main beam axis to a beam half power point;
a receiver that receives signals from the transducers during a reception of emitted sound that has been reflected by the atmosphere;
an open-top enclosure in which the array, signal generator, phase and switching control and receiver are located, the enclosure comprising upwardly and outwardly-directed curved walls that define three flared lobes spaced 120° apart, wherein one of the beams leaves the enclosure from each of the lobes, in which each beam defines a main axis, and an about zero power null located at an angle from the beam main axis, and wherein the enclosure walls that define the lobes are located at about the locations of the nulls of the beams; and
a sound reflector within the enclosure and located and arranged such that it reflects the beams from a generally horizontal orientation as they leave the array, to a generally vertical orientation as they leave the enclosure.

* * * * *